United States Patent [19]

Isikoff

[11] Patent Number: 5,748,084
[45] Date of Patent: May 5, 1998

[54] DEVICE SECURITY SYSTEM

[76] Inventor: Jeremy M. Isikoff, 5840 Cameron Run Terr., #1527, Alexandria, Va. 22303

[21] Appl. No.: 751,842

[22] Filed: Nov. 18, 1996

[51] Int. Cl.$^6$ ................................................. G08B 13/14
[52] U.S. Cl. .................... 340/568; 340/571; 340/539; 340/825.31; 395/182.04; 395/182.13; 395/489; 395/186; 395/187.01
[58] Field of Search .................... 340/571, 568, 340/825.31, 691, 539; 395/182.04, 182.13, 489, 186, 187.01

[56] References Cited

U.S. PATENT DOCUMENTS

| | | | |
|---|---|---|---|
| 4,494,114 | 1/1985 | Kaish | 340/825.31 |
| 4,742,357 | 5/1988 | Rackley | 342/457 |
| 4,818,998 | 4/1989 | Apsell et al. | 342/44 |
| 4,908,608 | 3/1990 | Reinke et al. | 340/571 |
| 4,908,629 | 3/1990 | Apsell et al. | 342/457 |
| 4,954,836 | 9/1990 | Sakuma | 342/450 |
| 4,985,695 | 1/1991 | Wilkinson et al. | 340/571 |
| 5,021,794 | 6/1991 | Lawrence | 342/457 |
| 5,157,405 | 10/1992 | Wycoff et al. | 342/386 |
| 5,293,115 | 3/1994 | Swanson | 324/110 |
| 5,317,304 | 5/1994 | Choi | 340/571 |
| 5,327,144 | 7/1994 | Stilp et al. | 342/387 |
| 5,365,516 | 11/1994 | Jandrell | 370/18 |
| 5,406,261 | 4/1995 | Glenn | 340/571 |
| 5,418,537 | 5/1995 | Bird | 342/357 |
| 5,485,163 | 1/1996 | Singer et al. | 342/457 |
| 5,497,149 | 3/1996 | Fast | 340/988 |
| 5,508,708 | 4/1996 | Ghosh et al. | 342/457 |
| 5,578,991 | 11/1996 | Scholder | 340/571 |

*Primary Examiner*—Jeffery Hofsass
*Assistant Examiner*—Benjamin C. Lee
*Attorney, Agent, or Firm*—Lahive & Cockfield, LLP

[57] ABSTRACT

An object tracking, communication, and management system for a laptop computer or similar device, wherein a beacon or transceiver in the computer implements file integrity or device recovery steps. The beacon protects data, or transmits files or data from computer storage back to the owner or authorized party, either automatically or in response to a request for data recovery, and may broadcast a signal for tracking and recovery of the computer after a theft. Preferably the system also operates in a normal mode to provide or acquire files or data, to or from a remote location, as either requested by the operator or by a third, calling or transmitting party, or automatically, for normal communications or data upkeep. When activated as a security device it implements strategic machine control including enabling, disabling, or modifying functions of the computer and communication of data. The system includes a beacon with preferably both a transmitter and a receiver, internal security logic, and external system elements for locating the beacon via either RF tracking or the communication of its position coordinates back to the owner via the transmitter. A combination of hardware and/or software within the beacon and the host system initiates and coordinates operation of the aforementioned communications or security features. Tamper detection logic implemented in software or hardware responds to tampering or removal of the beacon or other components by alerting via the transmitter and/or disabling functionality of the host. Preferably low level codes operate at the bios level to assure effective operation even when higher level software or plug-in components have been overridden or removed.

18 Claims, 6 Drawing Sheets

DEVICE SECURITY SYSTEM

FIELD OF THE INVENTION

This invention relates to a system for locating, communicating with and managing expensive assets and in particular laptop computers and other portable electronic devices that include a microprocessor and memory.

BACKGROUND

As computers and other expensive consumer electronic devices become smaller and more portable, the risk of their being stolen increases dramatically. Of particular concern is the rising rate of laptop computer theft. Recent reports indicate that laptop computers are being stolen at the rate of 1500 a day in the United States alone, and account for almost a billion dollars in losses annually. Even more important than the actual dollar value of losses posed by this trend is the potentially devastating loss of the crucial information and data files contained on the stolen computers. Presently, business people store everything from addresses to corporate secrets on their laptop computers, and loss of this data can be of a magnitude to make the loss of the computer hardware itself seem insignificant. It has even been reported that foreign governments hire spies to steal the laptops of Fortune 500 employees in order to obtain corporate secrets.

Solutions are needed for this and related theft problems. Unfortunately the approaches that have in the past been directed to the recovery of stolen items have proved too impractical to be effective against this problem. Solutions like those offered for automobiles, incorporating large transmitters or GPS receivers and position data transmitters, are too unwieldy for incorporation in a laptop, or their implementation would be economically prohibitive, or result in poor performance when located within a building.

A number of security systems designed particularly for laptop computers have not been effective. Alarms and motion sensors are susceptible to false alarms which may quickly frustrate the user into not using them. Additionally, these devices do nothing after the computer is stolen. Software solutions which control the computer to automatically dial up a predetermined number have shown limited effectiveness, probably because they can easily be removed or because they simply do not function if the stolen computer is not plugged into a phone line.

SUMMARY OF THE INVENTION

These and other problems are addressed by the system and devices of the present invention for the location, communication with, and management of small electronic devices, especially laptop computers but also other microprocessor-containing devices or instruments. For simplicity laptop embodiments are discussed. A tamperproof beacon unit including a transponder or transceiver is placed within the laptop computer. Under normal circumstances the beacon implements a standard communication function for the general communications needs of the device such as e-mail, voice, data, fax, internet or other communication task. When theft of the computer occurs, however, the beacon is activated with a security control program to secure crucial data in the computer's storage, to enable or disable functions of the computer, and to either transmit or destroy or hide sensitive data. The beacon's transmission signal is preferably also trackable to locate and recover the stolen computer.

In one embodiment the device resides in a laptop computer and is largely incorporated in the mother board so it is neither readily detected nor easily removable. In that position it includes or controls a communications link which is preferably a two-way RF link, such as a cellular phone link, and a security module operates or controls the device to initiate or perform object location and file integrity or data security functions.

The security module includes file (i.e., data) security and device security functions, which are initiated upon receipt of an actuation signal indicating theft of the computer, and which thereafter utilize battery power from the laptop's power pack and available resources to preferentially implement file integrity and tracking/alarm functions. Preferably it disables certain portions of the computer to conserve power to effect a set of priority tasks. The actuation signal is preferably a broadcast signal, sent over a regional area once the owner learns that the computer has been stolen; however actuation may also be triggered by an internal alarm condition, for example a signal indicative that the user has failed to enter a required code or has attempted to remove or disable a component. The file integrity or tracking/alarm functions preferably include at least one and preferably more of the operations of broadcasting out critical files, destroying or encrypting files, and transmitting a tracking RF signal such as a cellular phone signal with a code or message identifying the stolen computer.

DETAILED DESCRIPTION

The preferred embodiment of the present invention addresses the foregoing problems using an existing cellular telephone network to provide a novel and cost-effective solution to the problem of laptop theft while at the same time providing a complete two-way mobile communications and asset management system. In this embodiment, a beacon comprised of a cellular transceiver and a modem is installed in the laptop computer or electronic device which is to be protected, in such a way that removal or disabling of its operative elements is difficult or will impair the normal or useful operation of the computer. The transceiver is configured in a manner known in the art to send and receive data or programs, so as to implement the general communications and management needs of the end-user under normal circumstances; but it is also configured as described further below for data recovery or the tracking of the computer after a theft, in which case it operates to expedite return of the stolen computer and preferably also transmit important data to the rightful owner; to protect the integrity of the data contained on the machine; to assist in the capture of the thief; and to serve as a deterrent against theft. This operation substantially enhances value, yet is achieved at little additional premium over the cost of the basic communications hardware. Implementation of such security features takes several forms in different embodiments of the invention described below.

Figure 1:
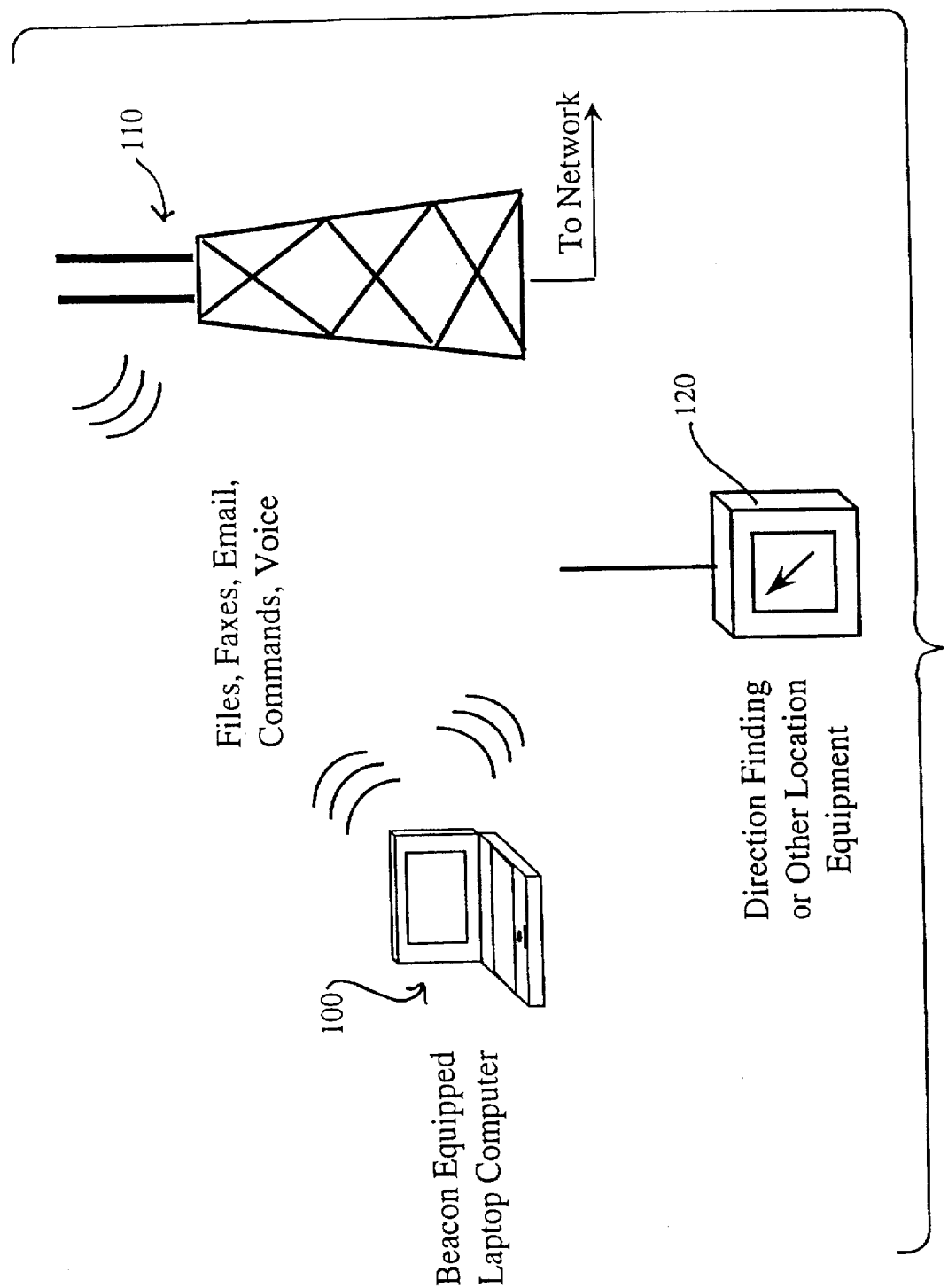
FIG. 1 illustrates a beacon-equipped laptop computer in accordance with the present invention.

FIG. 1 shows a beacon equipped laptop computer 100 of the present invention configured for operating within a terrestrial cellular network, represented by relay station 110. Mobile communications of all types are relayed between the laptop computer and the local cellular transceiver. Such communications may consist of voice, data, faxes, e-mail, pages, file transfers etc. and may be initiated by either the laptop computer user or a calling party. Thus in this embodiment, the computer contains a cellular phone transceiver, and this transceiver is activated by various voluntary or automated applications, to effect the above-enumerated communications functions in a manner known in the art. That is, it may be manually initiated by a user calling out, connecting to another computer or network, and sending or receiving data, or it may include software of a type known in the art to effect automatic file transfer and data backup with a remote host or network, at scheduled intervals. The substantial functionality implemented in this embodiment of the invention allows the major hardware components to be subsumed under the cost of a necessary hardware accessory application, such as a cell modem file saver, for which the high cost is acceptable for many users and the marginal cost of the security-specific hardware and software for implementing the invention, described further below, is low.

As noted, the security system includes a cellular phone RF communications assembly. This device transmits radio waves so that an external tracking circuit may pinpoint the location of the device by suitable detection e.g., using a two-point mobile receiver/signal comparator such as a directional finder mounted in a police vehicle. For a cellular-based system such tracking can be effected largely automatically using existing cellular technology which monitors broadcast i.d. and signal strength in each cell, supplemented with the detailed signal evaluation such as is employed for example for triangulating from cells to pinpoint the source of emergency (911) cellular telephone calls. FIG. 1 also illustrates a tracking apparatus 120 for locating the laptop computer by monitoring its RF transmissions emanating from the beacon. These RF signals may be followed to track the computer to its new location.

If the computer is stolen the beacon is advantageously also activated to secure its data. This is done in one or more of several ways; it operates to recover or destroy important data, or to disable the computer. The particular security measures to be effected may be set in advance, or may be controlled by an external communication, in which case the user or law-enforcement authorities may make the decision as to which of these steps is appropriate.

Figure 2:
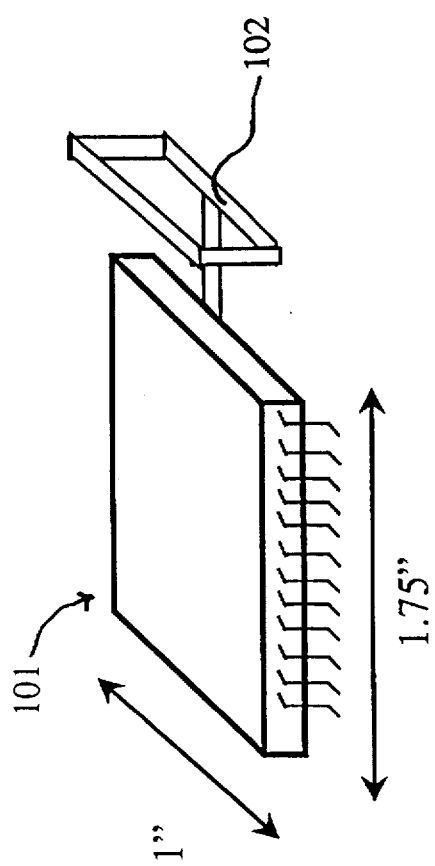
FIG. 2 illustrates a physical layout of the beacon in one embodiment of the invention.

A physical design of the preferred embodiment is illustrated in FIG. 2. Key aspects of this design are the integration of device components, having small size and low-profile packaging into the layout of existing laptop computer designs. FIG. 2 illustrates a small hybrid-packaged beacon 101 using a loop antenna 102 integrated into the computer housing.

Figure 3:
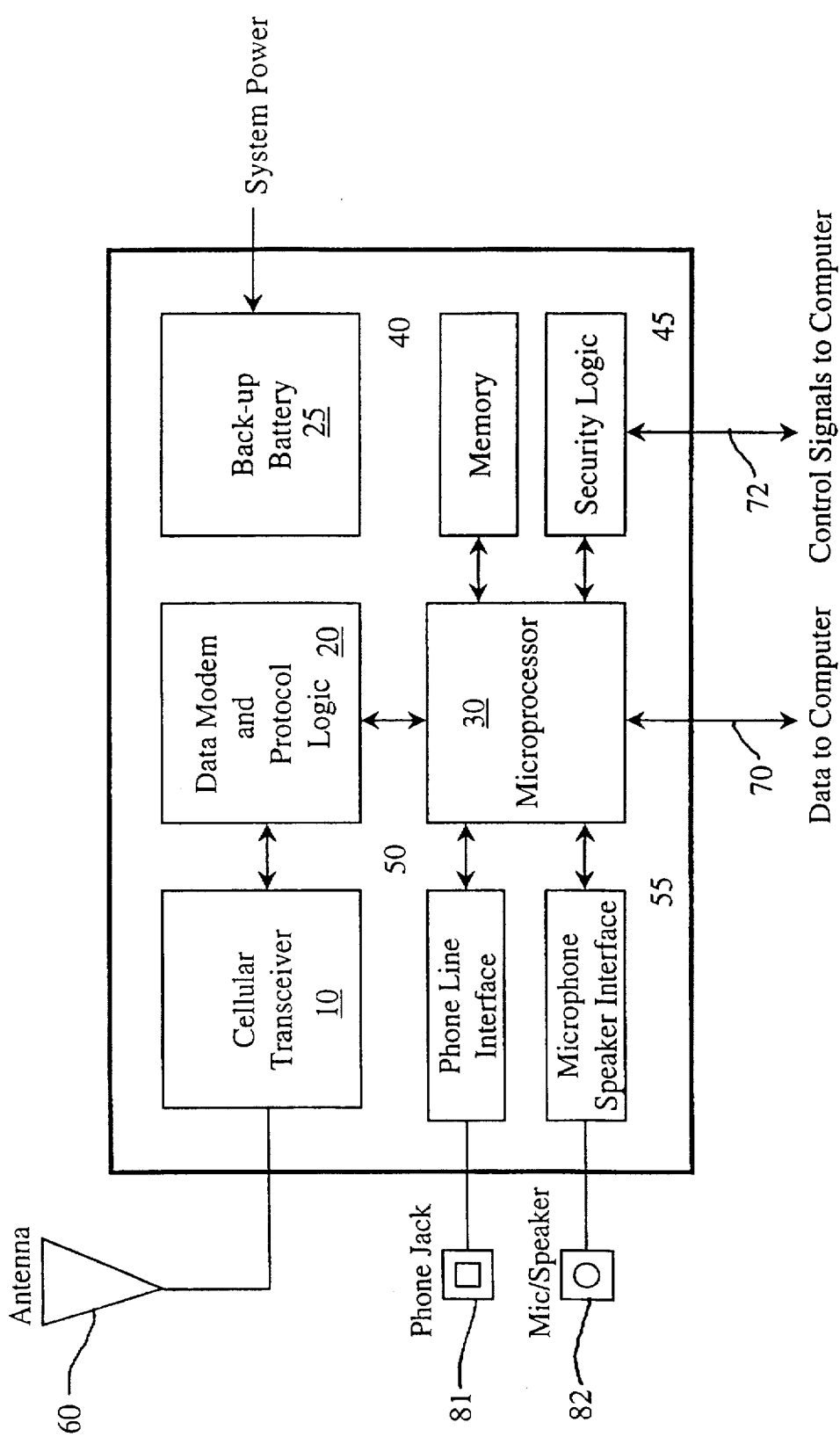
FIG. 3 illustrates a preferred laptop embodiment of the invention communicating via cellular telephone.

In general, a cellular embodiment of the beacon is comprised of the various circuit elements shown in FIG. 3. These include a cellular transceiver 10, a data modem 20, a back-up battery 25, a microprocessor 30, memory 40, additional security logic 45, a phone line interface 50, a microphone and speaker interface 55, an antenna 60, and connections 70, 72 to the host computer and its phone and microphone jacks 81, 82.

The beacon may be implemented in a removable package that communicates with the laptop processor or various sybsystems thereof via a cryptographic exchange, to effectively prevent unauthorized removal or bypassing of its security logic. As discussed more fully below, various power or device control signals may be routed through or from the beacon, such that it disables parts of the laptop when the device is stolen, for example by erasing the hard disc, removing the drive power, or otherwise. It may also initiate a locally detectable alarm, such as an alarm sound or a theft message displayed on the screen.

Figure 4:
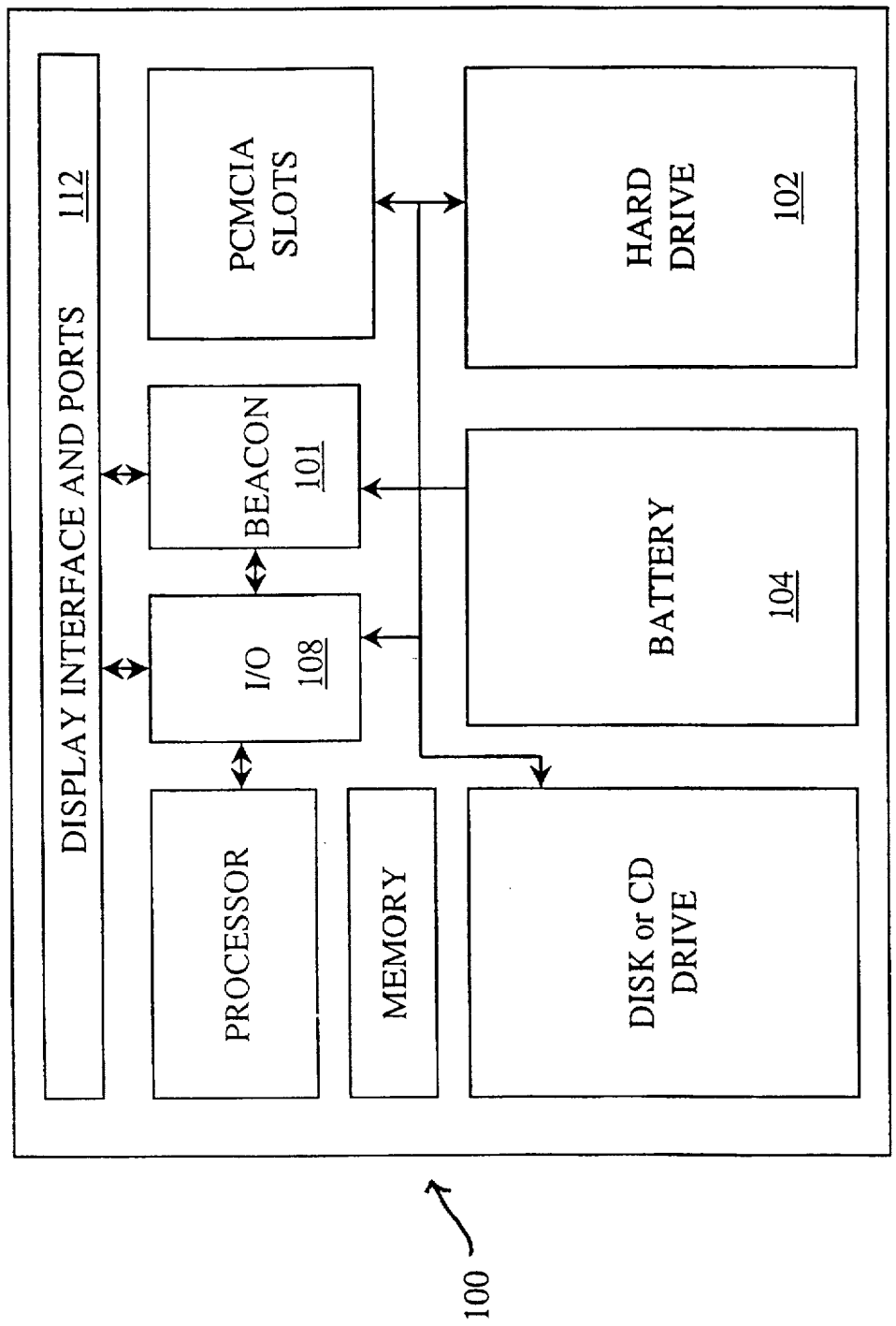
FIG. 4 illustrates interconnection of the beacon in a laptop computer and its interconnections with various parts of the host computer system.
Figure 5:
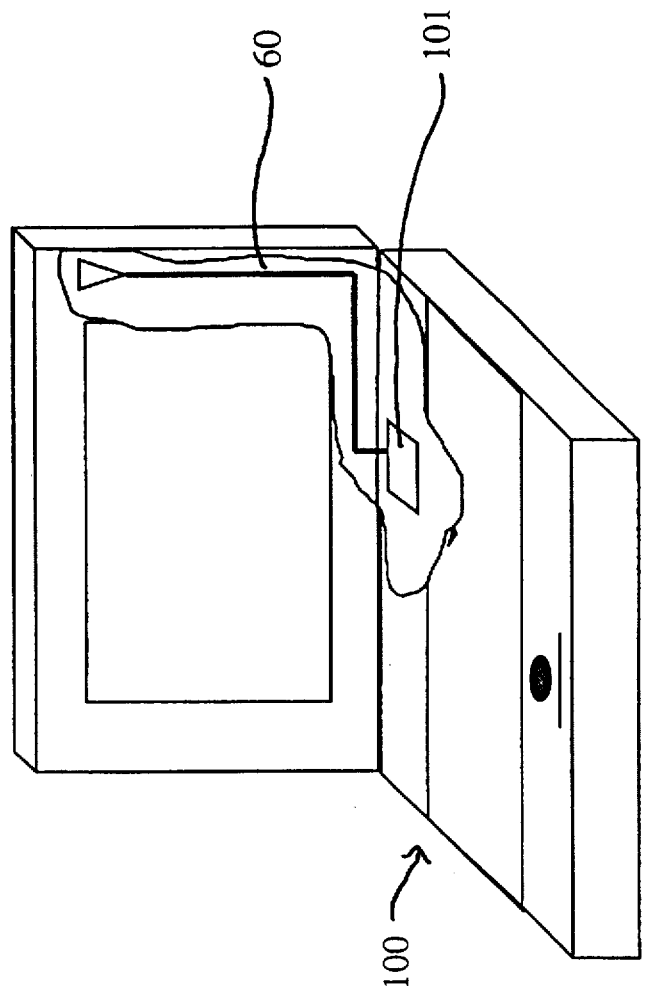
FIG. 5 shows a cut-away view of a laptop computer with the beacon and an antenna inside.

As shown in FIG. 4 and FIG. 5 the beacon is built-in to the computer 100 and has access to various system resources such as the hard drive 102 and the battery 104. Preferably, as shown, the battery power for the laptop is routed through the beacon, which controls a switch to cut power to the computer 100 or various subsections thereof. The beacon communicates with the computer via the I/O logic 108 and the beacon has connections to the interface ports 112 of the computer, e.g., to the phone jack and microphone jack on the back of the computer. In addition, as shown in FIG. 5, the antenna 60 for the beacon 101 is incorporated into the design for the computer allowing many possibilities for different antenna configurations. In particular, the antenna may be formed by suitably-dimensioned conductive paths on a flex circuit or by metal tape adhered to the laptop housing or cover, or otherwise positioned to enhance its sensitivity and/or improve its reception or operation. Preferably, a simple circuit coupled to the antenna confirms antenna integrity, i.e., provides an internally-detected alarm indication if the antenna is cut or removed.

It is envisioned that the beacon itself be permanently attached to the computer, however it is possible that for the purposes of upgrading its functionality it may be made as a removable chip or assembly.

In either case, additional security is preferably achieved by configuring the beacon such that the computer does not function properly without the beacon in place. The invention contemplates several ways of implementing this operation, including logic verification of hard-wired connection or function of critical components, such as by an antenna check circuit as described above. In an alternative embodiment of the invention, the beacon is contained in a removable PCMCIA card or other upgradable type of package in combination with firmware or other logic which assures that only authorized users can remove it or change it. In such an embodiment, when the PCMCIA or other upgradable package is removed by an unauthorized person, the computer ceases to function, rendering it valueless. Such operation may be implemented by using access control software which informs the computer through password verification that an authorized person is removing or upgrading the beacon. The beacon may also contain a serial number or other identification mechanism to inform the host computer of its identity. In other or further tamper protection implementations, when the beacon determines that the antenna has been destroyed or tampered with, it actuates its various internal security protocols described below.

In additional embodiments, the invention contemplates a system wherein an external operation stimulus is provided to ensure that the beacon is in place and operating normally. This external stimulus may be, for example, a periodic radio or telephone message from outside which resets or enables the computer for twenty-four hours. In that case, when the computer is reported stolen, this external message is withheld, and failure to receive the message initiates the complete disabling of the computer; i.e., the beacon shuts the computer down when it has not received an authorization call via cellular telephone within a twenty four hour interval. In other embodiments, the security device may also be triggered by actual receipt of a message broadcast by the user indicating theft. A similar triggering condition may be implemented by use of the CDPD network to require a user to log on to the laptop and acquire session tickets, as with the KERBEROS system, for example.

In addition to the hardware communications beacon, the system also includes interface software present on the laptop computer which provides the user interface with the communications and management features of the beacon and provides a means for the user to access all of the features of the beacon. Certain aspects of the software are preferably incorporated into the laptop computer's built in firmware for reasons of security, as described further below.

This beacon operation is as follows: incoming communications signals are received through the antenna by the cellular transceiver circuitry. This circuitry passes on the raw received signals to the protocol logic and data modem. The protocol logic and data modem determine what type of signal is being received and hence which mode the beacon should be operating in. The wireless modes of operation include an incoming voice telephone call, an incoming fax, an incoming data modem call, or an incoming CDPD packet. This information is passed onto the microprocessor which determines what actions need to be taken within the beacon, and what signals need to be sent to the host computer. The laptop computer preferably relays, or passes the information to, the beacon interface software for processing.

For an incoming voice call the microprocessor alerts the host computer via an interrupt or other hardware notification route. The interface software determines the appropriate response depending upon the state of the computer and the user's settings. If the computer is in use, the beacon interface software may provide a visual indication that an incoming voice call has been detected and request that the user either answer the call or pass it on to a voice messaging system. If the computer is not in use, an audio alert can be generated or the call passed on to an automatic messaging system.

In the event of an incoming data or fax call the microprocessor instructs the data modem to connect and then waits for the modem to produce data. Once data begins to be received, the microprocessor temporarily stores the data in memory and alerts the host computer. The host computer passes the data to the beacon interface software which queries the beacon as to what kind of data it is. Depending on the type of data, an alert is generated for the user displaying information about the data, its origin, and the length of the transfer. For faxes and e-mail, applications may automatically open for the user to view the data or to immediately respond via the already established connection. This conventional communications operation is altered when the security functions become active.

In that case, when an external communication is a post-theft call to initiate security operation, the incoming data call preferably also contains low-level beacon control commands which are interpreted by the beacon prior to the alerting or passing of the data to the computer. Such codes, for example, may be present in a header which the beacon reads and strips before passing the remaining data on to the beacon interface software on the computer. In a practical embodiment of one aspect of the invention these low-level control codes implement at least some of the security features of the device. Such features may include the disabling or interruption of power to all or to specific parts of the computer, the sounding of an alarm, or the erasure of the hard drive. The invention also contemplates the provision of other security codes which instruct the beacon to initiate a file-transfer call, in which case the microprocessor stores in memory the names or types of files to be transferred and the telephone number, fax number or e-mail address to which the files are to be transferred, as well as the time for the transfer to take place. The microprocessor then signals the host computer's low level beacon interface software to initiate the transfers. Some of the low level security code functions are performed by the security logic which may implement power switching and other simple hardware controls.

By "low level security codes" we distinguished from other higher level codes that are interpreted by the high-level beacon user interface. The purpose of the low-level codes is to perform the emergency functions under extreme circumstances. This includes the event that the high-level user-interface software is removed. That is, the low-level instructions are executed at a level in the computer at which the removal of the means of interpreting and executing instructions would cause the computer to cease to function at all. A preferred location for these instructions to be handled is within the computer's on-board bios. In this manner, the low-level security features are made secure against tampering; for example they are not impaired if a thief erases the hard disk, or changes an accessory board.

The higher level codes perform functions which are less critical and may be passed by the microprocessor to the user interface software. These codes may include signals that an automatic transfer is taking place and that the user need not be alerted, or codes for other such secondary functions. It is envisioned that many functions which ideally would be executed by low-level security codes may in fact be required to operate through calls to higher level security codes due to the constraints of the operating system. For example many, if not all, file access functions may be dependent on the operating system present on the hard disk. The removal of the operating system would render any access to files virtually impossible both for the thief and the beacon. This limitation may be avoided by protecting vital files automatically from being removed. When the beacon is activated in theft mode it might disable all write access to the hard drive to protect the operating system, thus assuring itself access to the files which need to be transmitted. As long as the file system remains in place then the beacon can perform its tasks. The protection of the operating system or of certain files may also be achieved in one embodiment by controlling the file, permissions of each file to change certain files to read-only or archive status in order to protect them until transmission.

Another type of incoming data is that of CDPD cellular packets. Such packets may contain e-mail, pages, etc. and might also contain low and high level control codes. These packets are examined by the microprocessor and passed on to the user interface software.

Another function of the microprocessor is to arbitrate between incoming cellular transceiver data and the phone line interface. It is possible that the computer may be plugged into a phone line and receive a cellular call at the same time. Several actions may have to take place. If the incoming cellular call is a voice call then the protocol logic alerts the microprocessor which may signal the host computer and establish a connection. If the incoming call is a cellular data call, the protocol logic tells the microprocessor whether the modem is already in use on the phone line. If this is the case, since there is only one modem, a decision must be made whether to disconnect the phone connection and reconnect on the cellular. This decision may be preset by user preferences in the high level software or may be set in the microprocessor itself. In any case only one data call can be maintained at a time. This limitation may be remedied by the inclusion of a second modem in the beacon. The same problem arises if the cellular modem is in operation and an incoming call arrives via the phone line. Again the protocol logic and the microprocessor arbitrate between the cellular transceiver and the phone line. It will be understood that incoming land-line calls can contain voice, data, fax, file transfers and security codes just as in the case of cellular calls described above.

The microprocessor also arbitrates and controls all outgoing calls. Outgoing calls from the beacon may be initiated by the user in a conventional manner through the user interface software, for example by entering an e-mail and clicking "SEND", or they may be initiated in the high-level user interface software or the low-level security software automatically. When the microprocessor receives data from the computer to transmit, it determines the most appropriate method of transmission and initiates a call. This determination may also be tagged in the higher-level software but must be agreed upon by the microprocessor according to the state of the beacon. In most circumstances the microprocessor preferably is set to choose the phone line interface, if present, for the outgoing call due to its generally higher bandwidth and lower rates of charge. If the phone line is in use by the user or another machine, the microprocessor judges the urgency of the transmission and may choose to either wait for the phone line to be free or to transmit the data via the cellular phone. If the beacon determines that the unit is not plugged into the phone line, then all operations are performed via the cellular connection.

The types of transmission possible are the same for outgoing calls as those described above for incoming transmissions. Faxes, e-mails, files, internet connection and voice calls can all be initiated either by the user or automatically for transmission. Voice, e-mails and faxes, and internet connection calls are generally user initiated while automatic transmissions may include some e-mails and some file transfers such as automatic back up file transfers, and the security transfers described below.

It is envisioned that the automatic file transfers will be useful for both emergency and non-emergency situations. Non-emergency file transfers are transfers such as routine back up of files either back to the user's home computer or corporate network, or to a commercial data warehousing facility for protective storage. The automatic back up functions determine which files to transmit in the same manner as for emergency file transfers, as described below, including transfer based on modification date and type of file as determined by the file extension, as well as any specfic files or directories specified by the user through application software. It is envisioned that a certain user might for instance desire to back up all word processing documents every three days automatically, whether connected to a phone or a network or not. If there is no other method available at the time, the back up software then compresses the files to be backed up and sends them over a dial-up connection using the cell modem. Preferences may be set as to when the transfers would take place so as to minimize the calling charges. Other management functions are available through the use of additional software and the cell modem beacon.

With this operation,information system managers become able to inventory the software and hardware configurations of all their company's machines, regardless of their location at the time. They can also update software automatically overnight or provide realtime systems support by logging onto the portable machine remotely and taking control of its functions. A good use might be the collection and redistribution of shared database files at the end of the day such as with a program like LOTUS NOTES. In this case, the database files would be transmitted by all mobile machines back to a central computer, which collates them and retransmits updated database files to the mobile machines via their cell modem beacons.

Under normal circumstances the beacon functions as the general communications provider for the host computer. When the computer is stolen however, the beacon operates at a concealed level as a special system controller and security broadcast beacon, thus providing the means to recover important data and track the stolen computer. These functions are implemented by the low-level security codes as described above.

Briefly, when the computer is stolen, the user determines whether there are any critical files which must be recovered whether the machine is found or not. The user sends a broadcast to initiate transfer of these files. This is done either through a central clearing house service center, which may for example be operated by a computer security company that provides broad-area RF/cell phone coverage to receive and temporarily store such data, or through the use of additional software e.g., emergency communications software present on another machine. This additional software may be included with the user interface software for installation on the users non-mobile computer and configured to carry out automatic back up and other management functions of the mobile computer. In any case in a theft/ notification mode the user determines which files need to be recovered and a request in proper format is sent via the cellular network to the laptop computer with low level security codes. Upon receipt of the lower level codes, the document recovery request is treated as a priority task and the codes are executed as soon as possible, resulting in the transmission of the vital files back to the owner. This step of the security protocol may be augmented by also carrying out the destruction of this data on the laptop, for example by file deletion or overwriting data on the hard disk.

The determination of which files to send over the RF link can also be achieved through application software running on the the computer without the intervention of the user. In this case, when the computer determines itself to be stolen either through an incoming RF broadcast informing it of its "stolen" status, or through one of the additional means described below (i.e., tamper detecting sensors or software tamper detection), the application software itself determines which files need to be transmitted. This determination may be based on the type of file as indicated on an MSDOS system by a three letter file extension, or based on the date of last modification, or the directory under which the files were contained, or by a combination of these methods. For example, the computer might send all word processing files with the file extensions ".TXT" or ".DOC" which have been modified since the last automatic backup.

The security functions described above may also be activated automatically through internal means present on the computer rather than through an RF signal. In accordance with this aspect of the invention, sensors are provided that detect various physical parameters related to the computer such as when the case is being opened or when the antenna or various pieces of the internal hardware are removed or tampered with, and the detected sensor states actuate the security logic to set off the various security features of the beacon. When these sensors detect unusual activity such as removal or physical tampering with a lock, switch, board or antenna, the security logic identifies an alarm condition and actuates the beacon so it performs such actions as erasing the hard drive, calling for help, transmitting important files or the like. In addition to hardware sensors, specific applications running on the computer may be configured to activate the beacon, for instance, when they detect unusual activity such as a failed password entry, an attempt to access a database, or an improper attempt to start the computer.

The beacon may also contain its own back-up battery to enhance the ability of the beacon to operate when power to the main computer is removed or run down. Preferably, when the beacon has received a security code indication, the beacon communications handling section is set up to recognize and ignore non-important incoming calls which require expenditure of too much power or which are of a type that could not be handled without the use of the higher level software. These incoming requests are simply logged to be handled at a later time. Some low-level security codes may also be stored in memory and either executed immediately or executed immediately upon the powering of the host computer. This prioritizing approach to post-theft communication assures that the critical data recovery or security tasks are implemented before the laptop power pack discharges, or that crucial tasks are identified and settings made to implement the tasks as soon as the battery is again charged.

Finally, as initially noted above, in a preferred embodiment of a system of the invention, the signals transmitted by the cellular transceiver are externally tracked to determine the location of the computer for recovery of the computer hardware. This may be done by determining what cell of a cellular phone system the beacon is currently located in, which in the case of cellular communications is a piece of information automatically derived by the system management, and then either triangulating its position or tracking the beacon with a mobile direction-finding unit. To conserve battery power, the non-data transmissions intended for tracking may be programmed to occur only in response to an incoming request or notification, or may be broadcast at discrete intervals or at prearranged times. Thus, according to this aspect, the invention contemplates a cellular beacon which operates intermittently for tracking, and which schedules or announces its intended time of operation in order to conserve power while assuring that a recovery or tracking force can efficiently direct its efforts to definite broadcasts and intervals.

The invention may be implemented in a number of embodiments, and while the above description sets forth detailed modes of operation for a cellular phone embodiment for which a transceiver and cell modem are available for communication, other embodiments may be implemented within the constraints of other communications links. Thus, for example, an RF pager-based system may receive its actuation signals, and receive messages designating actions to be taken or identifying files to be secured- e.g. erased or encrypted- and may transmit its ID or a tracking signal via a pager or other transmitter.

Figure 6:
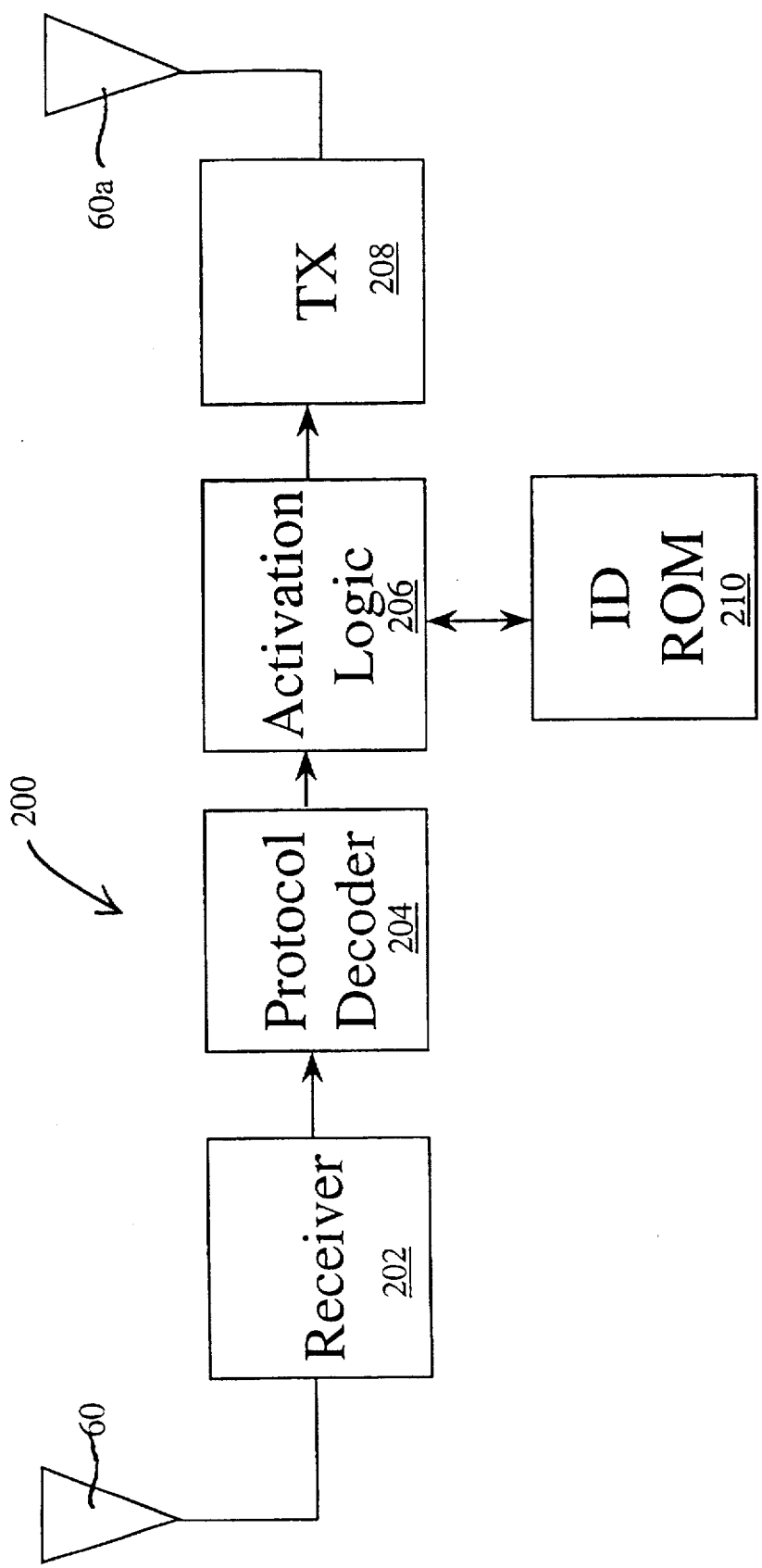
FIG. 6 illustrates another embodiment of the invention configured to perform security and recovery within a paging network.

FIG. 6 shows such a system 200. In this embodiment the RF signal in an antenna 60 is demodulated and amplified by a receiver 202 and the demodulated transmission is fed to a protocol decoder 204. Briefly, transmissions are effected in TDMA and the pager reception is synchronized with a synch signal to turn on during its designated message interval. The data it receives, e.g. several message words or more as the technology permits, is passed to the activation logic 206 which in this case corresponds in part to the security logic function described above; it compares the beacon ID number to the received address or may determine if an additional message designating a "stolen" state is received. It then performs one or more of the transmission and internal security actions described above.

Specifically, when the received pager message indicates theft, the activation logic may pass an output actuation signal to immediately initiate low-level or bios security functions, and also activate transmitter 208 to broadcast the ID number stored in ROM 210. In general, data reception capabilities of this embodiment may be limited, but the pager-based beacon may also receive designations of files, and may include or interface with a simple security control unit to effect the disabling, selective erasure or file encryption operations described above for securing data. A second antenna 60a may be provided for the pager transmitter 208 if necessary for a distinct transmission frequency; the pager antenna(e) may be distinct from that of the cellular phone if one is present in the laptop. The ID may be sent out in the pager transmitter's call-received acknowledgement protocol, confirming reception of the "stolen" message. To aid in the tracking process, a GPS receiver may be included in some embodiments and the transmitter may transmit its position coordinates; a separate transmitter or a pager transmitter configured to transmit these few additional data words may be used.

The invention thus constitutes a built-in communications apparatus which operates from the laptop power supply both to determine when the laptop is stolen and to implement data security actions to recover files or prevent loss of information. Preferably it includes logic which operates on system inputs as well as user transmissions to undertake both machine-initiated and message-responsive measures, thus assuring data security or recovery under all circumstances. Further by operating with low-level codes and a beacon integrated with the mother board it effectively prevents a stolen computer from being easily modified for sale, and assures that the computer is trackable.

While the invention has been described above in connection with specific embodiments and alternative implementations, modifications and variations thereof will occur to those skilled in the art in the light of the foregoing description. In particular, while the beacon has been described in relation to the management of laptop computers, it is also applicable to control or monitor any electronic device such as a PDA, a movable piece of industrial electronic equipment, and the like. In addition, the beacon need not contain all the functions described, but may contain only a subset of these functions. For instance the beacon may contain only a receiver which accepts security commands and operates as described to overwrite files or to shut down or restrict operation of data devices in the laptop, or it may have only a transmitter which is activated automatically by the computer and transmits out files and tracking signals. While the preferred embodiment has been described as a system operating within the AMPS cellular phone network, other embodiments of the present invention may operate under GSM, PCS, Pager, Satellite, LAN, or other wireless communication system. Accordingly, the invention is intended to embrace all such alternatives, modifications, variations within its spirit and scope, as defined in the following claims.

What is claimed is:

1. A security system for a laptop computer of the type having a processor and a power supply with a memory and applications programs for data handling, such system including a beacon containing at least one of a receiver and a transmitter, security logic for determining when the laptop has been stolen or tampered with, and security means in said beacon responsive to a determination by the security logic for selectively controlling elements of said laptop computer to secure data stored therein, wherein said security means includes means for removing said data from memory and transmitting said data.

2. A system according to claim 1, wherein said security means includes means for selectively disabling access to or operation of said memory.

3. A system according to claim 1, wherein said memory stores data files and said security means disables computer access to at least a portion of said data files.

4. A system according to claim 1, wherein said security means is operative to initiate a trackable RF transmission by said beacon and also to selectively disable higher functionality of the laptop computer thereby assuring that battery power is applied first to a security transmission.

5. A system according to claim 1, wherein said security logic forms said determination by processing an authorization code entered by a user to thereby initiate selective control of said elements in response to unauthorized use of said computer.

6. A system according to claim 1, wherein said beacon operates in conjunction with applications software to normally back up files via automatic transmission to a host.

7. A system according to claim 1, wherein said beacon includes a receiver and a transmitter, and said system further comprises a data modem, wherein said security logic receives information in a transmission to determine that the laptop has been stolen, and thereafter controls said elements to effect recovery of at least one of said data and said laptop while conserving power in said laptop.

8. A system according to claim 1, wherein said beacon includes a receiver and a transmitter, and said system further comprises a data modem, wherein said security means receives information in a transmission to identify data files in memory, and thereafter controls said elements to secure said data files.

9. A system according to claim 8, wherein said security means secures said data by performing at least one of encoding, erasing, overwriting, hiding and transmitting out said data.

10. A system according to claim 8, wherein the security logic communicates with the processor and calls bios to execute a security function so as to implement said function despite tampering with higher level features of the system.

11. A system according to claim 8, wherein said beacon transmits the identified files to a host.

12. A system according to claim 11, wherein the beacon further coordinates a transmission time with a tracking receiver to thereby conserve battery power as it effects security tasks.

13. A security system for a laptop computer of the type having a processor and a power supply with a memory and applications programs for data handling, such system including a beacon, security logic for determining when the laptop has been stolen or tampered with, and security means in said beacon responsive to a determination by the security logic for selectively controlling elements of said laptop computer to secure data stored therein, wherein said beacon includes a receiver and a transmitter, said system further comprises a data modem, and wherein said security means collects files for recovery, and thereafter controls said elements to compress said files and transmit them to a host.

14. A system according to claim 1, further comprising a physical sensor for detecting physical tampering, and wherein said security logic responds to the physical sensor to form said determination of tampering.

15. A security system for a laptop computer of the type having a processor and a power supply with a memory and applications programs for data handling, such system including a transceiver and data modem, security logic for determining when the laptop has been stolen or tampered with, and security means in said transceiver responsive to a determination by the security logic for selectively controlling elements of said laptop computer to collect data files for recovery and transmit them to a host.

16. A system according to claim 15, wherein said security logic responds to at least one of a physical sensor, a message received by the transceiver, and an applications program to determine that the laptop has been stolen or tampered with.

17. A system according to claim 15, wherein said security means calls bios to disable operation of the laptop at a level that prevents access to data therein.

18. A system according to claim 15, wherein said security means resides in a tamper-proof package coupled to said processor such that removal of said package disables operation of the laptop.

* * * * *